(12) United States Patent
Glowa et al.

(10) Patent No.: US 9,497,899 B2
(45) Date of Patent: Nov. 22, 2016

(54) SENSOR FOR AIR CART METERING SYSTEM

(71) Applicant: Morris Industries Ltd., Saskatoon (CA)

(72) Inventors: Conrad A. Glowa, Yorkton (CA); John A. Lesanko, Sturgis (CA); Barry B. Barsi, Yorkton (CA); Jeffrey J. Gordon, Yorkton (CA)

(73) Assignee: Morris Industries Ltd. (CA)

( * ) Notice: Subject to any disclaimer, the term of this patent is extended or adjusted under 35 U.S.C. 154(b) by 0 days.

(21) Appl. No.: 14/584,827

(22) Filed: Dec. 29, 2014

(65) Prior Publication Data

US 2015/0181800 A1   Jul. 2, 2015

Related U.S. Application Data

(60) Provisional application No. 61/922,585, filed on Dec. 31, 2013.

(51) Int. Cl.
| | |
|---|---|
| *A01C 7/20* | (2006.01) |
| *A01C 7/08* | (2006.01) |
| *A01C 7/04* | (2006.01) |
| *G01F 11/24* | (2006.01) |
| *A01C 7/10* | (2006.01) |

(52) U.S. Cl.
CPC ............... *A01C 7/082* (2013.01); *A01C 7/04* (2013.01); *A01C 7/105* (2013.01); *A01C 7/20* (2013.01); *G01F 11/24* (2013.01)

(58) Field of Classification Search
CPC ............ A01C 7/04; A01C 7/20; G01F 1/661
USPC .................. 111/174, 178; 222/36, 40, 23, 71
See application file for complete search history.

(56) References Cited

U.S. PATENT DOCUMENTS

| | | | | |
|---|---|---|---|---|
| 5,650,609 A | * | 7/1997 | Mertins ..................... | G01V 8/16 250/222.1 |
| 6,093,926 A | * | 7/2000 | Mertins .................. | A01C 7/105 250/222.1 |
| 6,834,599 B1 | * | 12/2004 | Fuessel .................. | A01C 7/081 111/175 |
| 8,915,200 B2 | * | 12/2014 | Barsi ....................... | A01C 7/081 111/178 |
| 9,043,949 B2 | | 6/2015 | Liu et al. | |
| 2008/0163807 A1 | * | 7/2008 | Dean ...................... | A01C 7/127 111/11 |
| 2012/0211508 A1 | * | 8/2012 | Barsi ....................... | A01C 7/081 221/13 |

* cited by examiner

*Primary Examiner* — John G Weiss
(74) *Attorney, Agent, or Firm* — Hovey Williams LLP (57) ABSTRACT

An agricultural particulate delivery system includes a tank operable to contain particulate, a metering structure including a metering element operable to regulate flow of particulate from the tank, and a collector assembly configured to receive particulate from the metering structure. The collector assembly directs particulate into a particulate-transporting line configured to deliver particulate toward an implement. The system also includes a sensor located between the metering element and the particulate-transporting line and that is configured to detect particulate flow from the metering element to the particulate-transporting line.

24 Claims, 10 Drawing Sheets

SENSOR FOR AIR CART METERING SYSTEM

CROSS-REFERENCE TO RELATED APPLICATION

The present application claims the benefit of and priority from U.S. Provisional Patent Application Ser. No. 61/922,585, filed Dec. 31, 2013, the entire disclosure of which is hereby incorporated by reference herein.

BACKGROUND OF THE INVENTION

1. Field of the Invention

The present invention relates generally to an agricultural particulate delivering system, such as an air cart, often used as part of a seeder. More particularly, the present invention concerns an agricultural particulate delivery system having a metering structure operable to allow or restrict seed dispensation, a collector assembly configured to receive seed from the metering structure, and a particulate-transporting line for delivering particulate toward an implement for dispensing the particulate into the ground.

2. Discussion of the Prior Art

Those of ordinary skill in the art will appreciate that seeders are commonly used in the agricultural industry to dispense particulate materials such as seeds and/or fertilizers into the ground. It is known in the art of seeding to provide a large, high-capacity cart that is towed by a tractor, along with an implement having a multitude of ground-engaging openers that deposit the seeds and/or fertilizers carried by the cart. In the case of air seeders, the seeds and/or fertilizers carried by the cart are typically contained within large tanks or hoppers, with each tank dispensing seed into a collector positioned therebelow. The collector introduces the streams of material gravitating from the tanks into pneumatic conveying lines that deliver the materials to their ultimate destinations. A flow control structure is provided between each tank and the respective collector to control the rate at which the material enters the collector assembly or to restrict entry of the material into the collector.

This background discussion is intended to provide information related to the present invention which is not necessarily prior art.

SUMMARY

According to one aspect of the present invention, a particulate delivery system is provided for supplying particulate to an implement which deposits the particulate within the ground. The agricultural particulate delivery system includes a tank operable to contain the particulate, a metering structure including a metering element operable to regulate flow of particulate from the tank, and a collector assembly configured to receive particulate from the metering structure. The collector assembly directs particulate into a particulate-transporting line configured to deliver particulate toward the implement. The system also includes a sensor located between the metering element and the particulate-transporting line that is configured to detect particulate flow from the metering element to the particulate-transporting line.

Among other things, the particulate delivery system of embodiments of the present invention provides for improved flow sensing and control. More particularly, the preferred embodiment includes a flow control metering roller that is configured to dispense particulate flow in a seed curtain advantageously shaped for sensing, and a sensor positioned to detect the particulate before the seed curtain is broken by entry into a pneumatic particulate-transporting line.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms "axial," "axially," and variations thereof mean the defined element has at least some directional component along or parallel to the axis. These terms should not be limited to mean that the element extends only or purely along or parallel to the axis. For example, the element may be oriented at a forty-five degree) (45°) angle relative to the axis but, because the element extends at least in part along the axis, it should still be considered axial. Similarly, the terms "radial," "radially," and variations thereof shall be interpreted to mean the element has at least some directional component in the radial direction relative to the axis.

It is further noted that the term "annular" shall be interpreted to mean that the referenced object extends around a central opening so as to be generally toroidal or ring-shaped. It is not necessary for the object to be circular, nor does the object have to be continuous. Similarly, "toroidal" shall not be interpreted to require that an object be circular or continuous.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
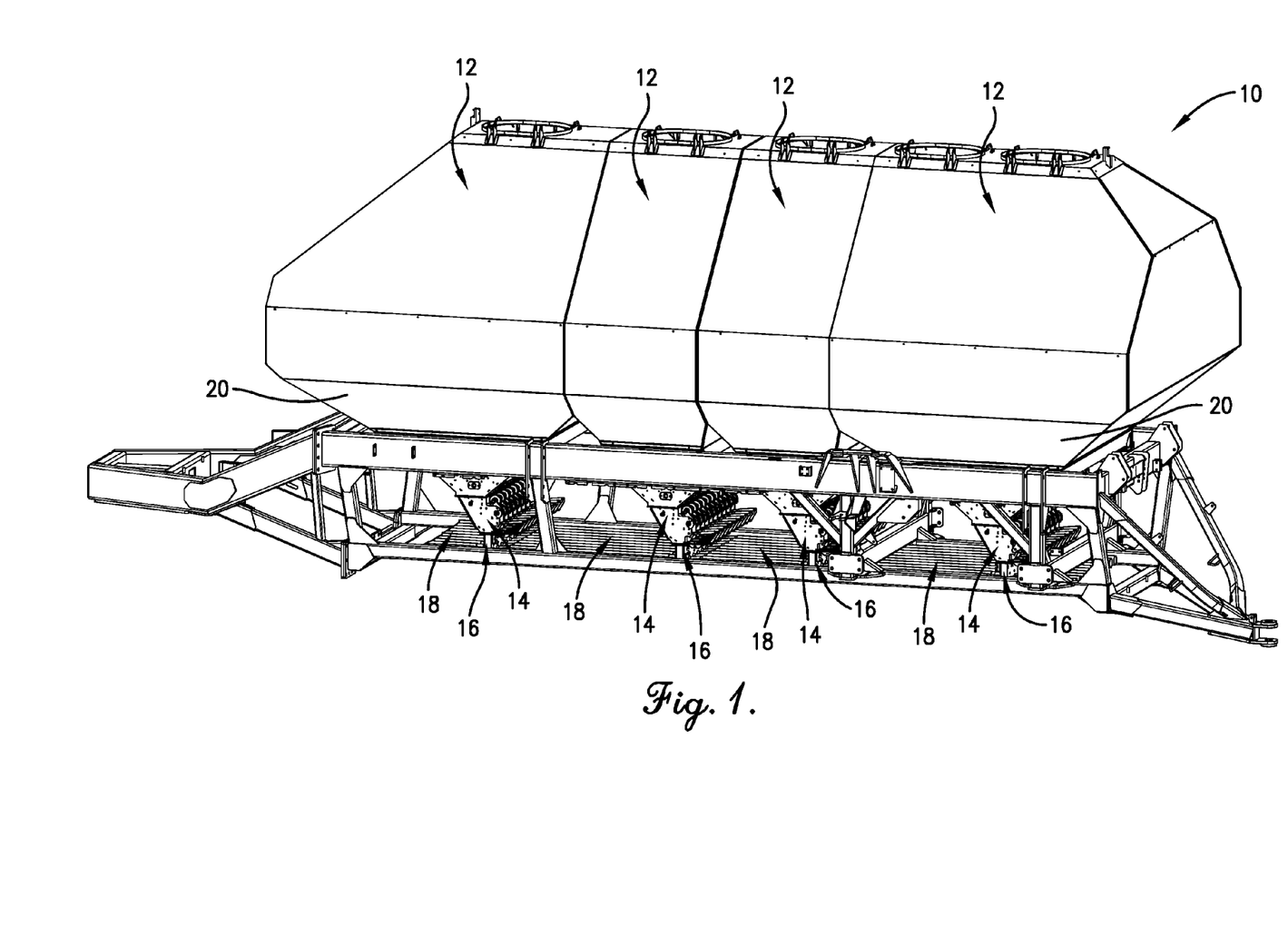
FIG. 1 is a left perspective view of an agricultural particulate delivery system or air cart, forming part of a seeder, constructed in accordance with a preferred embodiment of the present invention.

With initial reference to FIG. 1, the illustrated machine comprises an air cart 10 that is adapted to be connected in tandem with a towing tractor (not shown) and a planting implement having multiple openers thereon (not shown). Generally speaking, cart 10 supplies seeds and/or fertilizer to the planting implement as the tractor pulls both machines in tandem across a field. The air cart 10 and implement cooperatively provide a seeder that delivers particulate to the ground in a metered fashion.

The particular air cart 10 selected for purposes of illustration has four tanks 12 included as a part thereof, although this number may vary. The tanks 12 may be used, for example, to separately contain seeds, starter fertilizer, and additional fertilizer or granular inoculant for the soil.

As shown in FIG. 1 and others, a metering structure 14 is positioned below each tank 12, and a collector assembly 16 is positioned below each metering structure 14. Although not depicted, a pneumatic flow delivery system supplies conveying lines 18 running between collector assemblies 16. An exemplary pneumatic flow delivery system (not shown) includes a fan (also not shown) that provides airflow which is distributed to the particulate-transporting lines 18 via a distribution manifold (not shown).

Figure 2:
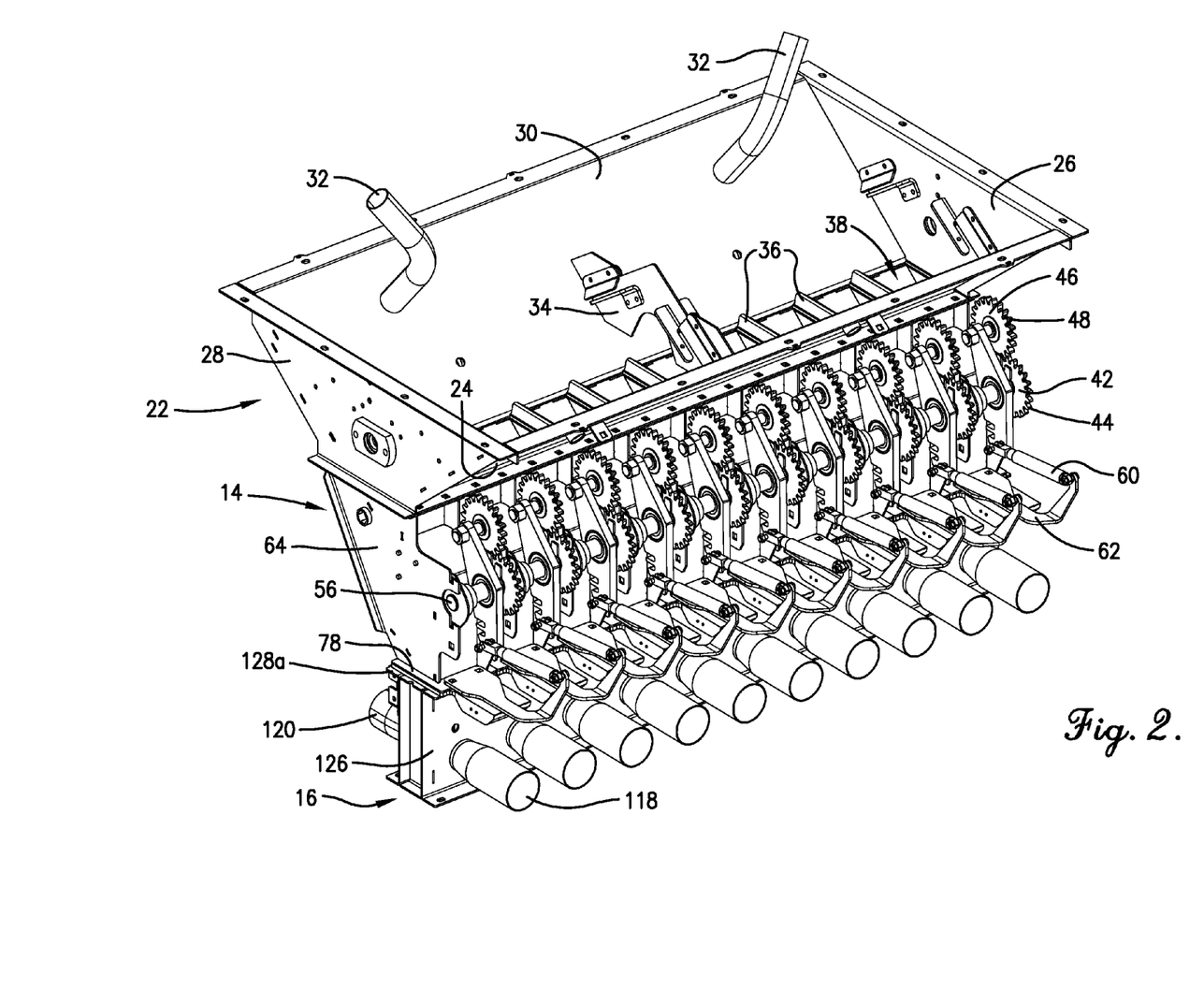
FIG. 2 is an enlarged left rear perspective view of a section of the air cart seen in FIG. 1, particularly illustrating the seed flow directing structures of the lower tank, a metering structure, and a collector assembly.

Referring to FIGS. 1-2, in a preferred embodiment each of the tanks 12 includes a storage portion 20 and an outlet portion 22 that is positioned below the storage portion 20 and coupled thereto. The outlet portion 22 is in vertical alignment with the respective metering structure 14. The outlet portion 22 preferably includes a rear wall 24, a pair of side walls 26 and 28, and a front wall 30. Each tank 12 is similarly configured, though general shape, volume and other commonly-adjusted features may vary in alternative embodiments based on overall cart design concerns and the needs of the operator, for example, on the need to provide different amounts of particulate across tanks. For the sake of brevity, only portions of a middle tank 12 and the associated components illustrated in FIG. 1 will be discussed in detail herein, with the understanding that the other tanks 12 and components are similarly constructed.

A tube or hose 32 extends into the interior of the tank 12 such that each tube 32 is in communication with the interior of the tank 12 at one end and with the respective metering structure 14 at the other end. The aforementioned structures thus form a pressure equalization system that ensures that the internal pressure in the tank 12 is the same as that in the metering structure 14. Such balancing of pressure helps prevent hang-up or "bridging" of the particulate within the metering structure 14.

Preferably, each outlet portion 22 includes a variety of structures designed for direction and control of the particulate material contained in the tank 12. For instance, the outlet portion 22 preferably includes a divider 34 that extends in a fore-and-aft direction to bisect the outlet portion 22. However, multiple dividers or none at all could be used. As shown in FIG. 2, a plurality of triangular diverters 36 are preferably provided at the base of the outlet portion 22. Each triangular diverter 36 further diverts the seed or particulate material, namely in one lateral direction or another. The material then exits the outlet portion 22 via one of a plurality of outlets 38. Other storage and outlet structures may be employed for storing and supplying particulate flow to a metering structure without departing from the spirit of the present inventive concept.

The illustrated metering structure 14 underlying each outlet portion 22 includes suitable metering elements for selectively discharging or stopping the flow of materials at a metered rate from the tanks 12 into the respective collector assemblies 16. More particularly, in the preferred embodiment, metering structure 14 includes a plurality of metering sections 40 (one of which is shown in more detail in FIGS. 4-6 and 9-10). Each metering section 40 is similarly constructed, and, for the sake of brevity, only a single metering section 40 and the associated components illustrated throughout the figures will be discussed in detail herein, with the understanding that the other metering sections 40 and components are similarly constructed.

Each metering section 40 includes, among other things, a rotatable drive wheel 42 having teeth 44, a rotatable engagement wheel 46 having teeth 48, and a rotatable metering wheel 50 having teeth 52. A metering roller 54 is connected to rotate with the metering wheel 50.

In the illustrated embodiment, each of the drive wheels 42 is mounted on a common drive shaft 56 to rotate therewith. However, it is within the ambit of the present invention for multiple drive shafts to be used, provided that appropriate drive mechanisms are present.

In a preferred embodiment, the rate of rotation of the drive shaft is controlled by a transmission system (not shown). A variety of transmission systems known in the art are suitable for implementation with the inventive seeder without departing from the spirit of the present invention. For instance, a positive ground drive transmission having dual- or multi-speed options might be implemented, or a variable drive transmission could be provided. Regardless of the exact implementation, the ability to vary the rotational speed of the drive shaft is desirable, since such rotational speed control allows the metering rate to be independent of tire rotational speed and to therefore be optimized for a variety of particulate materials. For instance, a slow speed may be desirable when seeding fine seeds such as canola or mustard, whereas larger seeds may suitably be dispensed at a higher rotational speed. In other instances, metering rate variations might be desirable based on the soil conditions in a particular location within a field.

Each metering section 40 also includes a control arm 58 pivotally mounted relative to the drive shaft 56 for swinging movement about a pivot axis that is aligned with the drive shaft 56. The engagement wheel 46 is rotatably mounted on the upper end of the control arm 58 in such a manner that the teeth 48 of the engagement wheel 46 are maintained in intermeshed engagement with the teeth 44 of the drive wheel 42. Rotation of the drive wheel 42 is thus transmitted to the engagement wheel 46. A hydraulic cylinder 60 is mounted at one of its ends to a cantilevered arm 62 and is connected to the lower end of the control arm 58 at the other of its ends.

Figure 9:
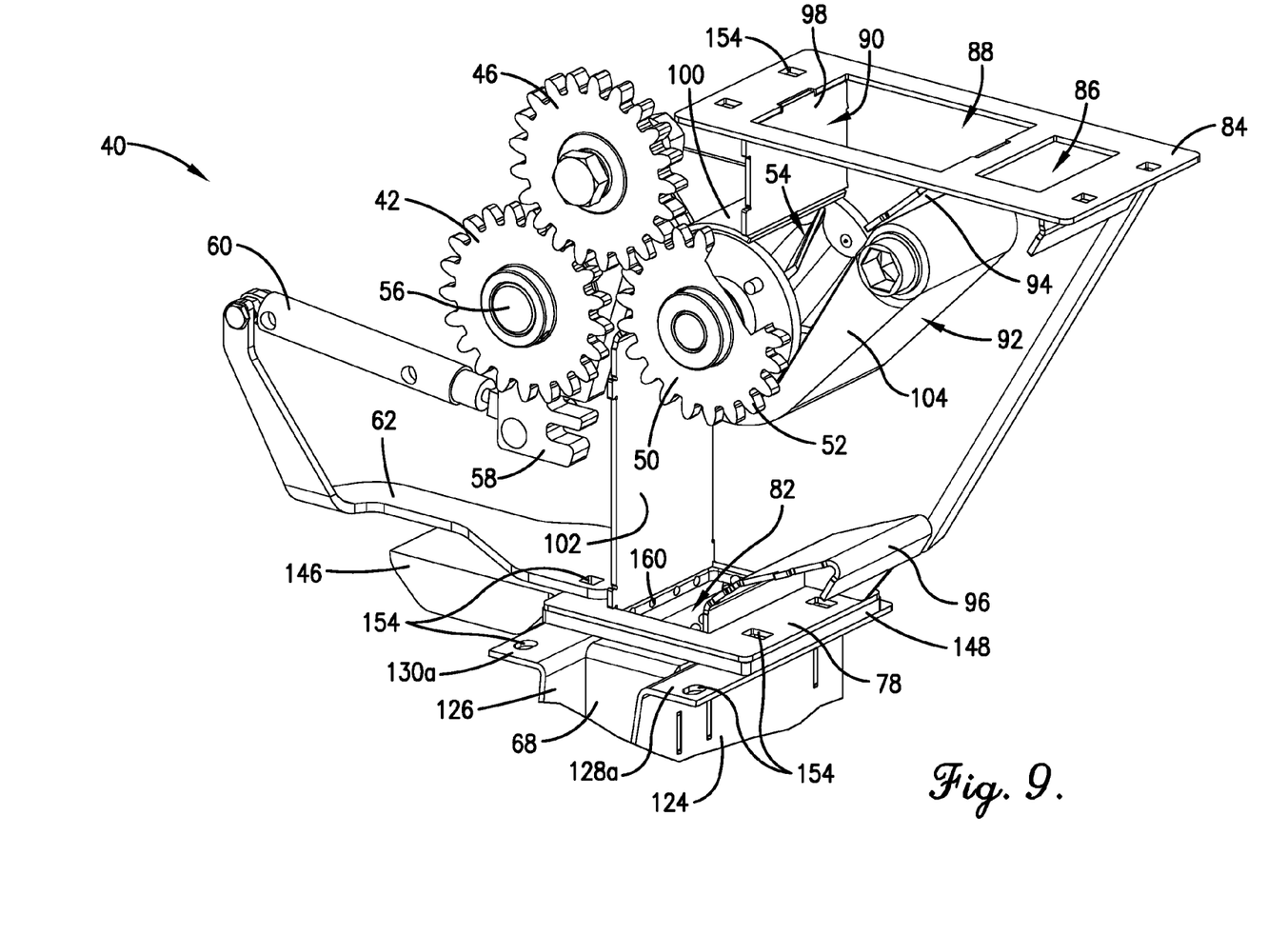
FIG. 9 is a right front perspective view of a metering section, particularly illustrating the metering wheel and the engagement wheel in an engaged configuration.
Figure 10:
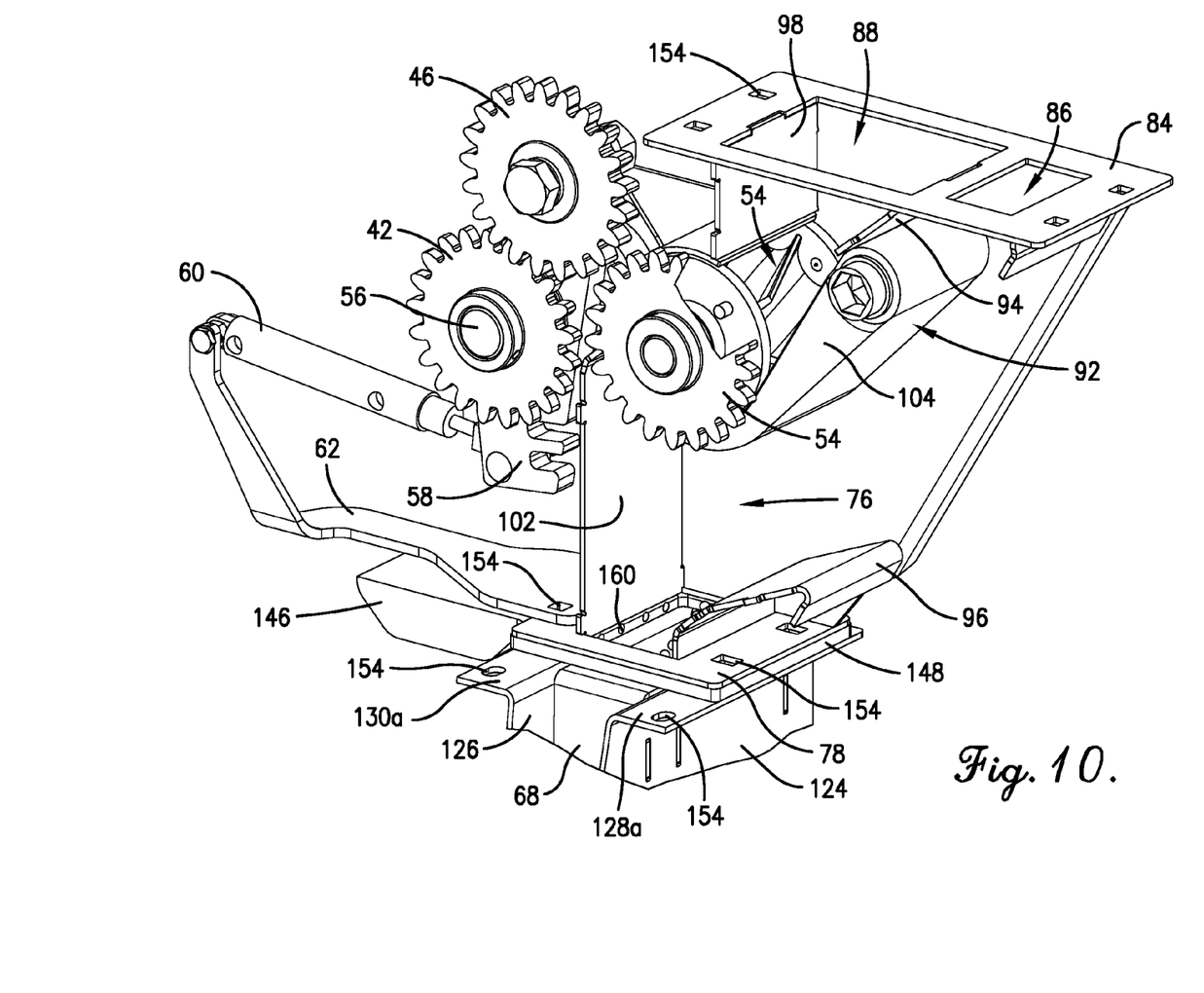
FIG. 10 is a right front perspective view of the metering section similar to FIG. 9, but illustrating the metering wheel and the engagement wheel in a disengaged configuration.
Figures 11, 12:
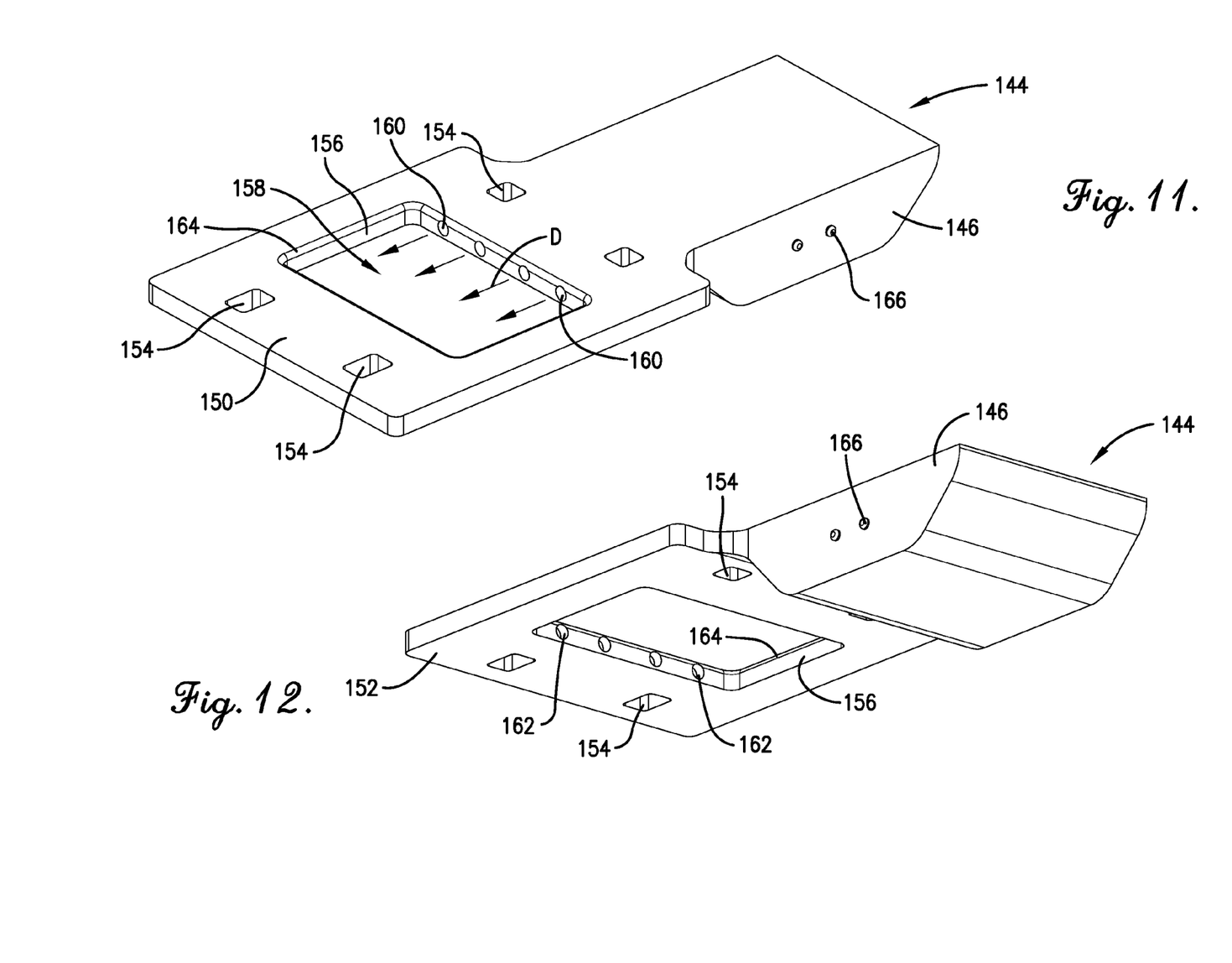
FIG. 11 is a left front perspective view of the particulate sensor seen in FIG. 5.
FIG. 12 is a left rear perspective view of the bottom of the sensor seen in FIG. 10.

As best shown in FIG. 9, when the hydraulic cylinder 60 is retracted, the upper end of the control arm 58 pivots forward such that the engagement wheel 46 mounted thereon is operable to drivingly engage the metering wheel 50 by means of the intermeshing of teeth 48 of the engagement wheel 46 with teeth 52 of the metering wheel 50, to thereby cause the metering wheel 50 and, in turn, the metering roller 54, to rotate. As best shown in FIG. 10, however, when the hydraulic cylinder 60 is extended, the upper end of the control arm pivots backward such that the engagement wheel 46 mounted thereon is not operable to drivingly engage the metering wheel 50. That is, the teeth 48 do not intermesh with the teeth 52. Rotation of the metering wheel 50 and, in turn, the metering roller 54, will thereby either cease or fail to be initiated. Seed or particulate material dispensation can therefore quickly and selectively be initiated or stopped for each individual metering section 40.

The above-described metering configuration is highly advantageous, providing near-instantaneous stoppage of seed dispensation. In a system that attempts stoppage using a moveable gate above a metering roller, for instance, the quantity of seed having already passed by the gate en route to the roller will still be dispensed after the gate has been closed. By contrast, the configuration described herein stops the dispensation directly at the roller. Therefore, the only particulate dispensation that will occur after disengagement of the engagement wheel and metering wheel is that due to continued inertial rotation of the metering roller (which is minimal because of the frictional engagement between the roller, particulate, and surrounding structure). Stoppage of dispensation is therefore nearly instantaneous.

Although hydraulic cylinders are used in the preferred embodiment for actuation of the control arms 58, it is noted that a variety of actuation means fall within the scope of the present invention. For instance, pneumatic or spring-based actuation systems might be used. Furthermore, a single actuator could act on more than one metering section or on all of the metering sections simultaneously. Ultimately, however, a quick-acting actuating system is desirable.

It is further noted that a mechanism other than a pivoting control arm could be used to enable engagement and disengagement of the engagement and metering wheels. For instance, means could be provided for non-pivoting fore-and-aft shifting of the engagement wheel or, if the teeth were configured appropriately, the engagement wheel could swing laterally toward and away from the metering wheel.

The components for controlling operation of the metering roller 54 are preferably constructed according to principles of U.S. Pat. No. 8,915,200, which is hereby incorporated in its entirety herein.

Each metering section 40 also includes a pair of vertical metering partitions 64, 66 that form the sides of an upright metering passage 76. The metering partitions 64, 66 correspond to and are arranged in vertical alignment with end walls 68, 70 and collector partitions 72 found in the collector assembly 16. Accordingly, the upright collector passages 74 and the upright metering passages 76 are in vertical alignment with each other.

Each metering section 40 includes a base plate 78 having a rectangular enclosed rim including a rear rim segment and defining an opening 82. The metering section 40 also has a top plate 84 defining an opening 86 and an opening 88. The opening 82 connects the metering passage 76 with the collector passage 74. The opening 86 directly or indirectly connects the metering structure 14 with the tube or hose 32 so as to allow for pressure equalization between the metering structure 14 and the tank 12. The opening 88 is in communication with the outlet 38 of the outlet portion 22 of the tank 12. The metering roller 54 is positioned within the upright metering passage 76.

As best shown in FIGS. 9-10, a variety of particulate guidance structures are provided to define the upright metering passage 76, and/or to influence the flow of particulate material therethrough. More particularly, in the preferred embodiment the guidance structures include a shield 90, a seed plate 92, an inlet guide 94, and an outlet guide 96. The shield 90 includes an upper portion 98, a curved middle portion 100, and a lower portion 102. The seed plate 92 includes an arm region 104 having an end 106. Particulate material that enters the metering section 40 through the opening 88 is guided toward the metering roller 54 by the inlet guide 94, the arm region 104 of the seed plate 92, and the upper portion 98 of the shield 90. The particulate material is then trapped in pockets 108 formed by a plurality of flutes 110 of the metering roller 54, such that the material is transported by the metering roller 54 as it rotates in a clockwise direction as viewed in FIGS. 9-10. When the end 106 of the seed plate 92 is reached (see FIG. 5), however, the material falls downward under the influence of gravity toward and out of the opening 82 in the base plate 78. The material is guided toward the opening 82 by the lower portion 102 of the shield 90, as well as by the outlet guide 96. Any particulate material that does not fall from the pockets 108 travels upward until it is enclosed in the pockets 108 by the curved middle portion 100 of the shield 90. The middle portion 100 and the upper portion 98 thus ensure that particulate material is not lost out of the back of the respective metering section 40.

Figure 5:
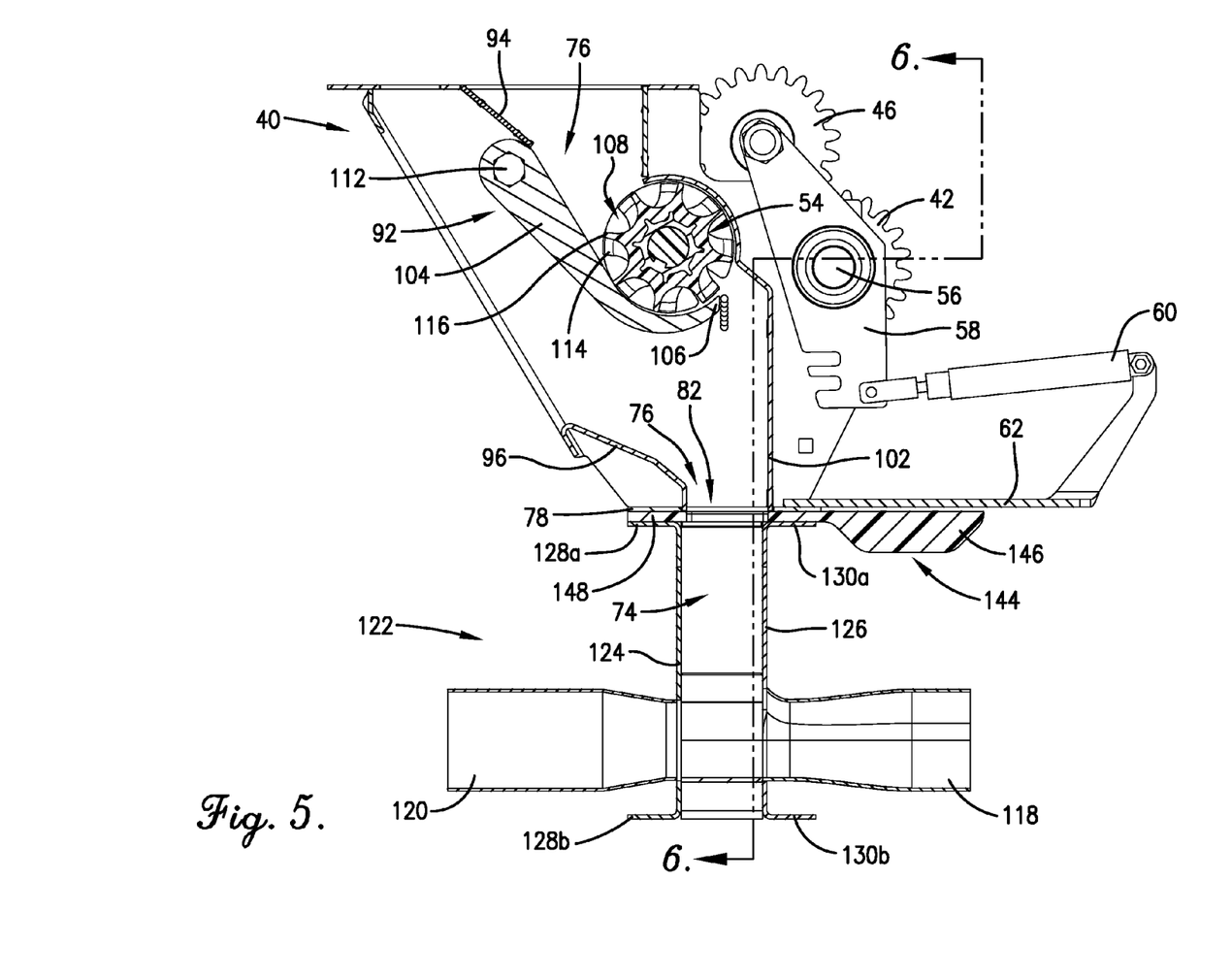
FIG. 5 is a vertical cross-sectional view of the metering section and collector module seen in FIG. 4, particularly illustrating the side profile of a sensor having a sensor head positioned between the metering section and the underlying collector module.

In the preferred embodiment, each of the seed plates 92 is mounted on a shared shaft 112, best shown in FIG. 5, that traverses the upright metering passages 76, and the plurality of seed plates 92 are selectively pivotable about the shaft 112 for positioning in a range of configurations, from very close proximity to the metering rollers 54 to a substantial distance from the metering rollers 54. Such positional control of the seed plates 92 provides the operator with the ability to further customize the metering process to various particulate sizes.

It should be noted that a variety of particulate guidance structures for guiding and/or forming a seed curtain in the metering structure for delivery through the opening in the base plate may also be employed without departing from the spirit of the present inventive concept. Alternative embodiments may include seed plates of different shape at their end portions or having multiple end portions, or modified seed plates including ridges for additional seed guidance, with the spacing and configuration of the ridges varying according to the seed type.

Figure 7:
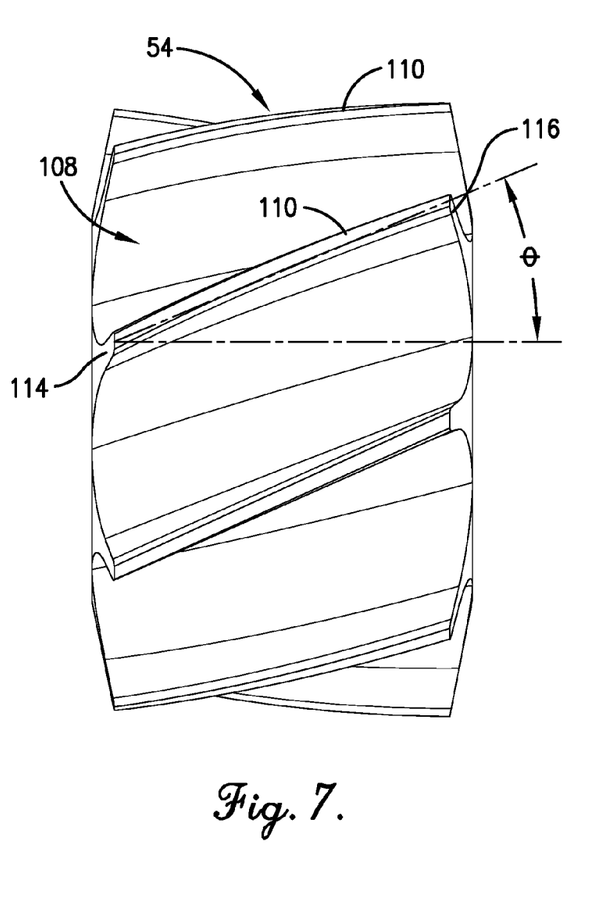
FIG. 7 is a front view of the metering element seen in FIG. 6, particularly illustrating angular aspects of flutes and pockets of the metering roller.
Figure 8:
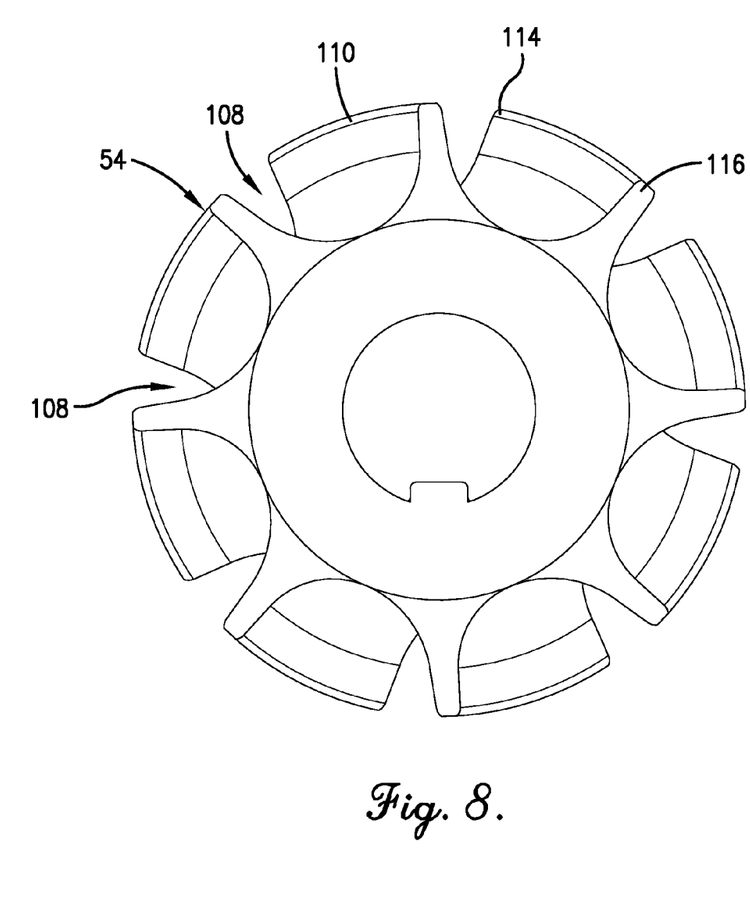
FIG. 8 is a side view of the metering roller seen in FIG. 7.

Preferably, the plurality of flutes 110 of the roller 54 are arranged in a helical pattern to define the plurality of particulate-receiving pockets 108 therebetween. As best shown in FIGS. 7-8, each flute 110 extends from a leading edge 114 to a trailing edge 116 at an angle θ relative to the axis of rotation of the metering roller 54. Angle θ in a preferred embodiment is between about fifteen degrees (15°) and about twenty-five degrees (25°). However, a variety of roller configurations are permissible and other metering elements are possible without departing from the spirit of the present invention. For instance, the flutes could be arranged in a herringbone or other type of pattern, a non-fluted roller could be used, a roller on a different axis of rotation having a continuous spiral flute extending along a generally cylindrical outer circumference could be employed, or even metering elements including gated sections operatively associated with guidance structures designed to shape such seed curtains may be used; provided, however, that in each case the metering element and guidance structures dispense particulate to a sensor passage in a seed curtain, as described in further detail below. Furthermore, with respect to certain aspects of the invention, the metering structure could alternatively be configured to vary the rate of particulate dispensation rather than just providing "on" and "off" configurations.

Returning to FIG. 9, the preferred metering roller 54 is illustrated having an axis of rotation substantially perpendicular to the direction of particulate flow. As the roller 54 rotates, the leading edge 114 is the first portion of a flute 110 to push particulate material held within a pocket 108 over end 106 of seed plate 92. Because of the angle of the flutes 110, one end of the pocket 108 is exposed past the end 106 of seed plate 92 before the other. Therefore, some material within the pocket 108 begins to fall prior to subsequent trailing material from the pocket 108 being, in turn, pushed over the end 106. This progression of particulate material falling from a pocket 108 toward opening 82 thus forms a grouping having a leading end that traverses the opening 82 first and a trailing end. Because of the shape and orientation of the preferred particulate guidance structures, and most pointedly of the end 106 of seed plate 92, the particulate material falling from a pocket 108 falls in a vertically-staggered, diagonal line pattern. The material preferably falls substantially along a plane that faces a passage wall of the sensor from which a beam is emitted (as discussed further in detail below), forming a single-particle depth seed curtain substantially in that plane. As will be further described below, the seed curtain may be alternatively configured without departing from the spirit of the present invention.

More broadly, the preferred metering sections 40 are separately and selectively engageable with drive shaft 56, so that metered dispensation of particulate may be controlled individually at each metering section 40, as discussed in more detail above. A variety of systems can be implemented for controlling which of the metering elements are engaged and when. An operator-based system would be permissible, for instance, with the machine operator manually flipping switches, pressing buttons, or providing input to a guided user interface in order to signal the cylinder actuation(s). An automated system could be used, as well. For instance, a system which automatically allows or prevents seed dispensation from certain metering sections based on a known seeding plan and the current position of the machine could be used. In one implementation, this system could be based on machine coordinates derived from a global navigation satellite system (GNSS) or global positioning system (GPS). Hybrid systems or other varieties of manual and/or automated systems fall within the scope of the present invention, as well. Ultimately, however, a system that allows for quick signal transmission and resulting engagement or disengagement of a selected metering roller or rollers is desirable.

Returning to FIG. 1, each of the tanks 12 is also provided with its own collector assembly 16 positioned below the tank 12 and metering structure 14. The collector assembly 16 serves to introduce materials from the tank 12 into a number of conveying air streams. Such air streams are produced by a pneumatic flow delivery system such as the one described generally above. The number of conveying lines 18 can vary widely without departing from the scope of the present invention. In the present application, however, there are a total of ten lines 18, each comprising a plurality of segments and tubes 118, 120, wherein the segments are connected to the respective ones of tubes 118, 120, which are, in turn, fixed to collector modules 122. Conveying lines 18 are also fluidly connected to or integral with flexible hoses that lead to the planting implement (not shown), where appropriate divider structure (also not shown) splits each stream into a number of secondary product streams leading to individual openers of the implement.

Each collector assembly 16 comprises a generally hollow body that includes collector modules 122. The collector assembly 16 is generally rectangular and is fabricated from a plurality of plate materials to present a front wall 124, a spaced rear wall 126, and a pair of opposite end walls 68 and 70. Front wall 124 is provided with flanges 128a and 128b; rear wall 126 is provided with flanges 130a and 130b; and end walls 68 and 70 are provided with flanges 132a, 132b and 134a, 134b, respectively. All of the aforementioned flanges facilitate bolting, directly or through an intermediate structure as discussed in further detail below, of collector modules 122 to the bottom of the metering structure 14. In alternative embodiments, a second row of collector modules may be added in a position below the first row, and in such embodiments the aforementioned flanges will also facilitate bolting of the first row of modules to the second row.

The interior of the collector assembly 16 is subdivided into collector modules 122 by a plurality of upright, transversely spaced collector partitions 72 (see FIG. 6) extending between front wall 124 and rear wall 126, there being a total of one fewer such partitions 72 than there are pairs of tubes 118, 120. In the preferred embodiment, for instance, nine partitions 72 are present; and the collector partitions 72 cooperate with one another and with opposite end walls 68, 70 to present ten separate collector modules 122 across the width of the assembly 16, with the collector modules 122 being effectively sealed from one another. Collector modules 122 directly underlie corresponding outlets of the metering structure 14 so as to receive ten corresponding, discharging streams of material from such structure 14.

Figure 3:
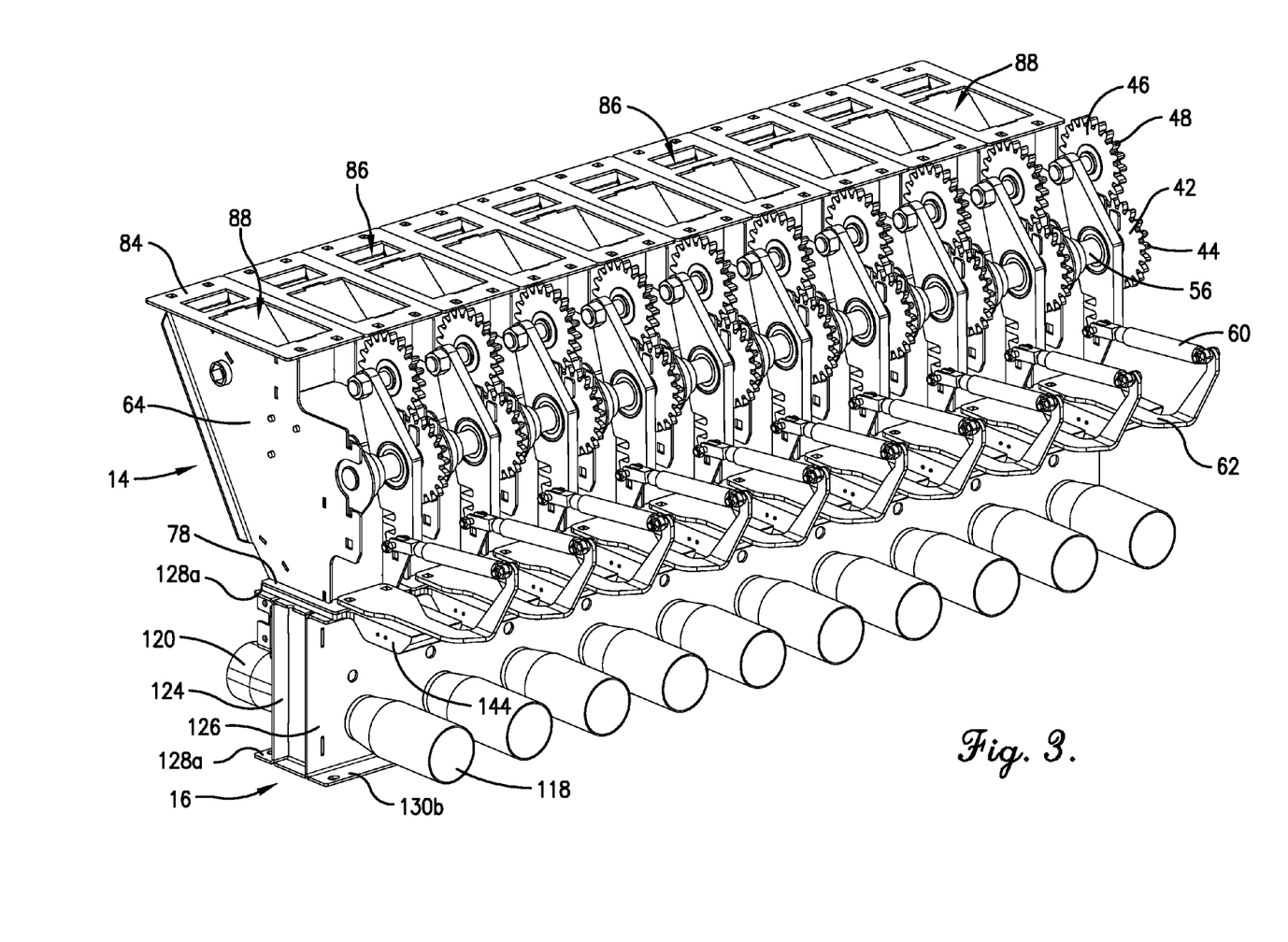
FIG. 3 is an enlarged left rear perspective view of the cart section seen in FIG. 2, sans portions of the lower tank.
Figure 4:
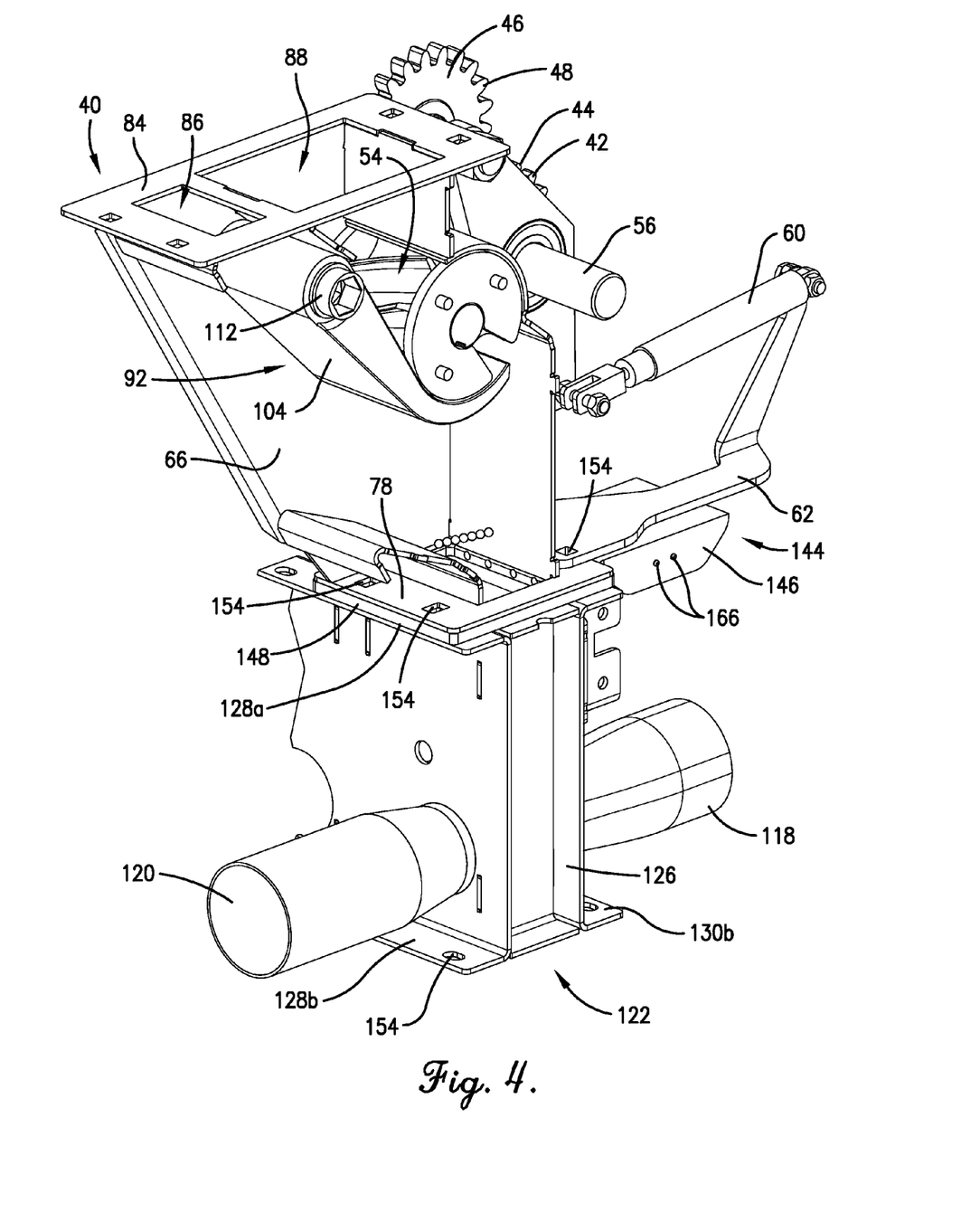
FIG. 4 is a front left sectional perspective view of one of the metering sections and collector modules of the cart section seen in FIG. 3.
Figure 6:
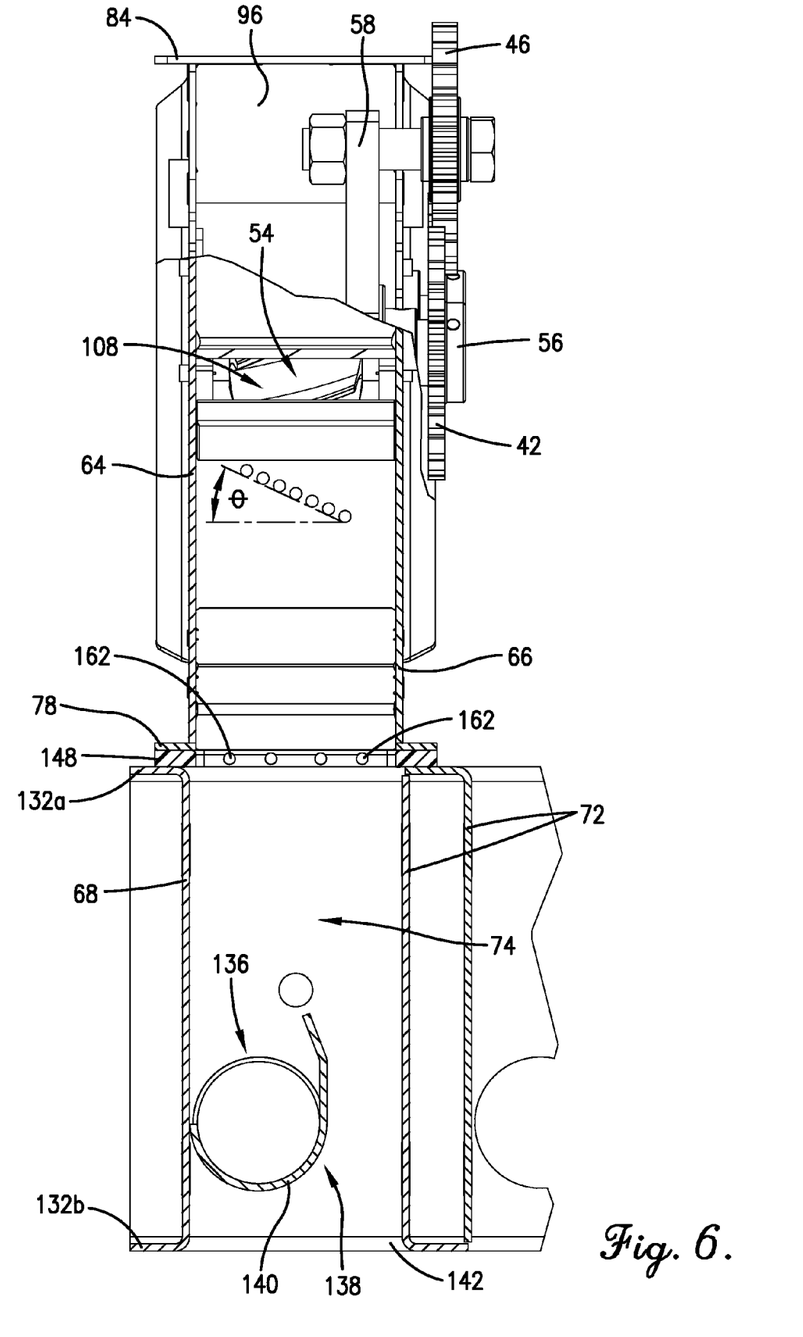
FIG. 6 is a rear sectional view of the metering section and collector module taken along line 6-6 of FIG. 5, particularly illustrating aspects of a seed curtain formed of vertically-staggered, single layer rows of particulate falling through an upright passage.

Regardless of the number of modules 122 that are present, each collector module 122 is provided with a loading zone 136 formed by a transversely J-shaped cup 138 extending between front wall 124 and rear wall 126 thereof (see FIG. 6). A generally upright leg (not shown) of cup 138 is located approximately halfway between adjacent collector partitions 72 and terminates at a distance below the top margin of each module 122. A concave leg 140 of each cup 138 likewise extends the entire distance between front wall 124 and rear wall 126 and has its distal end welded or otherwise secured to the proximal partition 72 or end wall 68 as the case maybe. Concave leg 140 of each loading cup 138 registers with an inlet (not shown) in rear wall 126 and an outlet (not shown) in front wall 124. As shown in FIG. 3 and others, rear tube 118 comprises part of the conveying line 18 and is secured to back wall 126 in registration with the inlet, while front tube 120 is secured to front wall 124 in registered communication with the outlet. Thus, each loading zone 136 is disposed within the path of pressurized air flowing through a corresponding one of the conveying lines.

During operation, air streams from conveying lines are constantly passing through the body of each collector assembly 16. Thus, in the illustrated embodiment, all of the loading zones 136 are always exposed to conveying streams of air. Product traveling along a generally upright flow pathway may begin at the tank 12, flow through an upright metering passage 76 and gravitate through collector passages 74 to land in a loading zone 136 and be immediately entrained in the air streams passing through loading zones 136, from there to be conveyed downstream through conveying lines 18. If the air streams coming into loading zones 136 have already been loaded with materials from an upstream tank, the products gravitating through the collector assembly simply join with the existing materials and travel together through conveying lines to their ultimate destinations.

Returning to FIG. 6, a floor 142 extends across the entire width of the body of collector assembly 16, and particularly across the bottom of the modules 122.

Each collector module may optionally contain its own diverter valve (not shown), such as the generally upright leg described generally above, moveable between a position completely covering and thus closing off the loading zone, and an alternative extreme position in which the valve is inclined in the opposite direction to open the loading zone. Alternative structure for selectively diverting flow to and from each loading zone may be employed on other embodiments without departing from the spirit of the present invention.

It will also be appreciated that calibration of the metering unit can be easily achieved by removing the floor from a particular collector assembly and replacing it with a calibrating receptacle (not shown), so that product can be run through each metering section and discharged into the calibrating receptacle for measurement. Desired adjustments of the appropriate components of the metering section can then be readily carried out.

Fixed between the metering roller 54 and the particulate-transporting line 18 is a sensor 144 configured to sense particulate flow from the metering section 40. The preferred sensor 144 has a sensor body 146 and a sensor head 148. The sensor body 146 extends rearward of the opening 82. In the preferred embodiment, the sensor head 148 is sandwiched between the base plate 78 and flanges 128*a*, 130*a*. More particularly, the preferred sensor head 148 has a top surface 150 abutting the lower surface of the base plate 78, and also has a bottom surface 152 abutting the upper surface of flanges 128*a*, 130*a*. The sensor head 148 is fixed in place by fasteners (not shown) extending through bolt holes 154 in the sensor head 148 that are generally aligned with corresponding bolt holes 154 in the base plate 78 and flanges 128*a*, 130*a*. The sensor head 148 includes a generally rectangular passage wall 156 defining a sensor passage 158 fluidly connecting the upright collector passage 74 and the upright metering passage 76, and defining part of the generally upright particulate pathway described herein.

In the preferred embodiment, sensor 144 includes several emitters, namely light-emitting diodes 160, embedded in a rear segment of the passage wall 156. The diodes 160 are configured to emit a beam across the sensor passage 158 in a beam direction D, which, in the preferred embodiment, is substantially horizontal. Moreover, the beam is spaced from the discharge margin of the metering element, measured in a dimension which is generally vertical in the preferred embodiment, by less than about eighteen inches (18"), and more preferably by between four to ten inches (4-10"). Preferably, the discharge point of the roller 54 and the end 106 of the seed plate 92 generally coincide and together define the discharge margin, i.e., the position from which particulate is released toward the opening 82. The sensor 144 also includes several detectors, namely optical receivers 162, for receiving and interpreting the beam after it has traversed the sensor passage 158 in direction D. The optical receivers 162 are preferably embedded in a front segment of the passage wall 156 generally opposite the rear segment.

The passage wall 156 further includes a generally upward-facing entry portion 164, which in certain embodiments may serve as a guidance structure for diverting particulate flow toward the sensor passage 158. However, the sensor 144 is preferably dimensioned such that no part of the sensor 144, including the passage wall 156, obstructs the particulate flow. Preferably, therefore, the opening portion of the upright pathway defined by the passage wall 156 has a minimum cross-sectional area at least as large as the minimum cross-sectional area presented by opening 82 (in the illustrated embodiment, they are approximately the same size). The sensor 144 also preferably includes indicators 166 operable to visually convey signals indicating the state of operation of the sensor 144.

The preferred embodiment facilitates metered release of particulate in a seed curtain comprising a single-particle depth layer arranged in rows, wherein each of the rows includes a series of vertically staggered, laterally spaced particles (when viewed along a fore-and-aft direction within the sensor passage 158). For clarity, only a single vertically-staggered row originating from one of the pockets 108 of the roller 54 is illustrated in each relevant figure, with the understanding that the curtain in fact includes multiple similarly-configured rows (assuming, for example, that the roller 54 continues to rotate). It is particularly noted that the roller 54 is preferably configured so that the "trailing end" of one of the pockets 108 passes over the end 106 of seed plate 92 just before, or at the same time as, the "leading end" of the subsequent pocket 108 passes over the end 106 of the seed plate 92. Therefore, the last (uppermost) particle in each row either overlaps (in a vertical direction) or is at least vertically close to the first (lowermost) particle in the subsequent row. However, because the preferred seed curtain extends across the particulate flow pathway in a direction perpendicular to the direction of particulate flow and to the direction D of the beam, the particulate rows do not obscure one another. The seed curtain should not contain substantial amounts of particulate obscured from the sensor beam within the sensor passage.

It should be noted that, as used herein, "seed curtain" does not connote that groupings of particulate material (e.g., the particulate rows corresponding to the series of pockets 108 of the metering roller 54 from which they originate) are necessarily spaced closely together to form a continuous sheet or the like, nor, for that matter, does it connote that such groupings have substantial vertical spacing therebetween.

In other words, a seed curtain is preferably one or more groupings of particulate, most preferably with no obscured particles or, if necessary (albeit less desirable), only a minimal number of particles that entirely fail to pass within the "line of sight" of the beam projecting across the sensor passage. That is, the metering structure 14 is configured to arrange downstream particulate flow so that particulate is not obscured by other, intervening particles passing closer to the source of the beam (i.e., the light-emitting diodes). As such, a seed curtain in alternative embodiments may comprise one or more groupings that are vertically or horizontally staggered with respect to one another, with each grouping taking on any of a variety of shapes in multiple planes and from multiple perspectives, all without obscuring a substantial amount of particles from detection by the beam. Most preferably, in embodiments where some particles are obscured by other particles, such obscured particles make up less than ten percent (10%) of the overall particulate flow along the pathway. In a preferred embodiment, the metering structure and sensor arrangement thus ensures a higher accuracy measurement of particulate flow along the upright passages following metered dispensation.

Alternative sensor configurations may also be employed without deviating from the spirit of the present invention. For example, other sensors capable of sensing the particulate flow delivered from the metering element to the particulate-transporting line may be employed. More particularly, sensors relying on photoelectric or other "line of sight" technology are preferable—such as laser sensors, fiber optic sensors, luminescence sensors or light arrays—though other solid flow rate sensors such as those that sense particle deflection and convert same into electrical signals, may also be used.

Furthermore, the sensing beam produced by a sensor may be alternatively positioned without departing from the spirit of the present invention. For example, beam emitting and sensing structure of a sensor may be positioned in alternative locations along the upright passages, provided they are downstream of the metering element, and the resulting beam may be angled instead of substantially horizontal (as in the preferred embodiment) in other embodiments. In certain embodiments, the sensor may emit and detect the sensing beam from a common passage wall, and in such embodiments the sensor passage may be defined by the direction of beam emission. A sensing beam may, in still other embodiments, be projected across an upright passage in a lateral direction (with reference to a length dimension of an air cart), though such a ninety degree (90°) rotation of the sensor components from the preferred, illustrated positioning would preferably also involve rotating the metering element a complementary amount, such that the seed curtain generally extends in a fore-to-aft direction. Beam emitting structure for optical technologies may include the aforementioned optical diodes, laser diodes, or the like. Beam receiving structure may include the aforementioned optical receivers, laser detectors, or the like.

The particulate delivery system of the present invention provides several advantages. For example, the sensor of the preferred embodiment is preferably located along a generally upright pathway wherein particulate flow is at least partly due to the force of gravity. The sensor may therefore detect particulate flow with a high degree of accuracy, and preferably without interfering structures deforming the seed curtain following release from the metering element and cooperating guidance structure(s) (e.g., the seed plate). Similarly, as discussed in further detail above, a preferred embodiment includes the discharge margin formed by cooperating metering element and guidance structure(s) being in close proximity to the sensor, thereby reducing the likelihood of errors in flow detection. Furthermore, the sensor preferably senses particulate flow between a metering element and particulate-transporting line, thus providing an opportunity for sensing flow locally from an individual metering section.

Preferably, the sensor of the present invention is connected to a controller that provides a visual representation regarding flow status to an operator. More preferably, such a controller is configured to raise an alarm indicating any undesirable flow characteristics experienced at one or more metering sections of the air cart. In one use scenario, an operator may turn the metering sections "on" and "off" one by one and, utilizing sensors detecting flow from each metering section, determine whether and which such metering section(s) are operating normally and which are experiencing problems. The sensors are thus uniquely operable to help test whether the metering element(s) and/or guidance structure(s) are properly configured to form a seed curtain with an acceptably low occurrence of particulate obscurement from the beam within the sensor passage, and to determine whether the particulate flow expected based on mechanical observation (such as via drive train sensors) or experienced at the implement is met by a given metering section, aiding operators in localizing any problems in particulate delivery. The sensors thus also are operable for calibration of metering elements and/or guidance structures for optimization of flow sensing through a passage.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An agricultural particulate delivery system for supplying particulate to an implement which deposits the particulate within the ground, said agricultural particulate delivery system comprising:
   a tank operable to contain the particulate;
   a metering structure including a metering element operable to regulate flow of particulate from the tank, a collector assembly configured to receive particulate from the metering structure;

a particulate-transporting line configured to deliver particulate toward the implement, said collector assembly directing particulate into the particulate-transporting line; and an optical sensor located between the metering element and the particulate-transporting line, said tank, metering structure, and collector assembly at least partly defining a particulate pathway, with particulate flowing along the pathway in a flow direction from the tank to the particulate-transporting line, said metering structure being configured to form a seed curtain extending across the pathway in a first direction that is generally transverse to the flow direction, said optical sensor being configured to project a beam across the pathway in a second direction that is substantially perpendicular to the first direction, said optical sensor being configured to detect particulate flow from the metering element to the particulate-transporting line.

2. The agricultural particulate delivery system as claimed in claim 1, said metering structure including guidance structure cooperating with the metering element to present a discharge margin, with a portion of the pathway extending between the discharge margin and the optical sensor being open and thereby devoid of structure that would interfere with flow of the seed curtain therealong.

3. The agricultural particulate delivery system as claimed in claim 1, said particulate pathway having at least a portion thereof that is generally upright, with particulate flow along said at least a portion of the pathway being at least in part due to gravity.

4. The agricultural particulate delivery system as claimed in claim 3,
said optical sensor being interposed along said upright portion,
said optical sensor including a passage wall defining part of the particulate pathway,
said passage wall having a minium cross-sectional area dimensioned so as not to obstruct particulate flow.

5. The agricultural particulate delivery system as claimed in claim 1, said metering element comprising a rotatable metering roller.

6. The agricultural particulate delivery system as claimed in claim 5, said roller including at least one helical flute.

7. The agricultural particulate delivery system as claimed in claim 1, said optical sensor being positioned within the system to detect the particulate before the seed curtain is broken.

8. The agricultural particulate delivery system as claimed in claim 1, said optical sensor including at least one light emitter and at least one light detector that are spaced apart in the second direction, such that the seed curtain flows between the at least one light emitter and the at least one light detector.

9. The agricultural particulate delivery system as claimed in claim 8,
said at least one light emitter including a plurality of spaced apart light emitting diodes,
said at least one light detector including a plurality of optical receivers.

10. The agricultural particulate delivery system as claimed in claim 9,
said particulate pathway having at least a portion thereof that is generally upright, with particulate flow along said at least a portion of the pathway being at least in part due to gravity,
said metering structure being configured to arrange the seed curtain into at least one vertically staggered row of particles.

11. The agricultural particulate delivery system as claimed in claim 10,
said light emitting diodes and optical receivers being at least substantially level so that the beam is generally horizontal.

12. The agricultural particulate delivery system as claimed in claim 10,
said metering structure being configured to arrange the seed curtain as a single-particle layer in the second direction.

13. The agricultural particulate delivery system as claimed in claim 1,
said metering structure including a lower base plate,
said collector assembly including an upper flange,
said optical sensor being fixed between the base plate and the flange.

14. The agricultural particulate delivery system as claimed in claim 13,
said particulate pathway having at least a portion thereof that is generally upright, with particulate flow along said at least a portion of the pathway being at least in part due to gravity,
said base plate defining a base plate opening that defines part of said at least a portion of the particulate pathway,
said base plate opening presenting a minimum cross-sectional area along the bottom of the metering structure,
said optical sensor having a passage wall that presents a sensor passage,
said sensor passage defining part of said at least a portion of the particulate pathway,
said sensor passage presenting a minimum cross-sectional area at least as large as the minimum cross-sectional area of the base plate opening.

15. The agricultural particulate delivery system as claimed in claim 1,
said particulate pathway having at least a portion thereof that is generally upright, with particulate flow along said at least a portion of the pathway being at least in part due to gravity,
said optical sensor having a passage wall that presents a sensor passage,
said sensor passage defining part of said at least a portion of the particulate pathway,
said metering structure including guidance structure operable to direct particulate flow from the metering element toward the sensor passage to intersect the beam.

16. The agricultural particulate delivery system as claimed in claim 15,
said guidance structure including at least one of (A) a seed plate, (B) an outlet guide, and (C) shield.

17. The agricultural particulate delivery system as claimed in claim 1,
said metering structure being configured to arrange particulate flow into a single-particle layer seed curtain.

18. The agricultural particulate delivery system as claimed in claim 17,
said metering structure being configured to arrange the seed curtain into at least one row of particles.

19. The agricultural particulate delivery system as claimed in claim 1,
- said metering structure comprising a plurality of metering sections, each including one of the metering elements,
- said system including a plurality of the optical sensors, each being associated with a respective one of the metering elements.

20. The agricultural particulate delivery system as claimed in claim 1,
- said particulate pathway having at least a portion thereof that is generally upright, with particulate flow along said at least a portion of the pathway being at least in part due to gravity,
- said optical sensor having a passage wall that presents a sensor passage,
- said sensor passage defining part of said at least a portion of the particulate pathway,
- said pathway presenting a dimension measured between the metering element and the beam,
- said dimension being less than about eighteen inches (18").

21. The agricultural particulate delivery system as claimed in claim 20,
- said dimension being within the range of about four inches to about ten inches (4-10").

22. The agricultural particulate delivery system as claimed in claim 21,
- said metering element comprising a rotatable metering roller that generally presents a particulate discharge margin,
- said dimension being measured generally from the discharge margin.

23. The agricultural particulate delivery system as claimed in claim 1, said optical sensor including:
- a passage wall having generally parallel first and second segments,
- a plurality of light-emitting diodes embedded in the first segment,
- a plurality of optical receivers embedded in the second segment,
- said plurality of diodes being configured to project the beam across the particulate pathway in the second direction,
- said plurality of optical receivers being configured to receive and interpret the beam after it has traversed the particulate pathway.

24. The agricultural particulate delivery system as claimed in claim 1, said second direction being substantially perpendicular to the flow direction.

\* \* \* \* \*